(12) United States Patent
Yuan et al.

(10) Patent No.: US 8,254,041 B2
(45) Date of Patent: Aug. 28, 2012

(54) LENS SYSTEM

(75) Inventors: Kun-I Yuan, Taipei Hsien (TW); Ho-Chiang Liu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 268 days.

(21) Appl. No.: 12/713,311

(22) Filed: Feb. 26, 2010

(65) Prior Publication Data
US 2011/0075272 A1    Mar. 31, 2011

(30) Foreign Application Priority Data
Sep. 25, 2009  (CN) .......................... 2009 1 0307728

(51) Int. Cl.
*G02B 9/34* (2006.01)
(52) U.S. Cl. ....................... 359/773; 359/774
(58) Field of Classification Search .......... 359/773–774, 359/771–772, 776–778, 763–767, 769, 754–757
See application file for complete search history.

(56) References Cited

U.S. PATENT DOCUMENTS

| | | | | |
|---|---|---|---|---|
| 6,108,145 A | * | 8/2000 | McCrary | 359/820 |
| 6,813,099 B2 | * | 11/2004 | Yamaguchi | 359/779 |
| 7,613,389 B2 | * | 11/2009 | Suzuki et al. | 396/89 |
| 7,672,064 B2 | * | 3/2010 | Sakaki | 359/738 |
| 2007/0086769 A1 | * | 4/2007 | Watanabe et al. | 396/133 |

* cited by examiner

*Primary Examiner* — Jordan Schwartz
(74) *Attorney, Agent, or Firm* — Altis Law Group, Inc.

(57) ABSTRACT

A lens system, in order from the object, includes positive first lens, negative second lens, positive third lens, positive fourth lens, and an aperture stop positioned between the third and fourth lens. The second lens includes a first optical portion, a first support portion surrounding the first optical portion with a first surface and second surface. The third lens includes a second optical portion and a second support portion surrounding the second optical portion with a third surface and fourth surface. The fourth lens includes a light stop surface facing the object side of the lens system. The lens system satisfies the formulas: $d_{23} < 1.1 \times d_{34}$, where the $d_{23}$ is a distance along the optical axis of the lens system from the second surface to the third surface, and the $d_{34}$ is a distance along the optical axis from the fourth surface to the light stop surface.

12 Claims, 2 Drawing Sheets

LENS SYSTEM

BACKGROUND

1. Technical Field

The disclosure relates to lens systems.

2. Description of Related Art

In order to obtain high quality images, yet still offer small-sized camera modules for use in thin electronic devices, such as mobile phones, personal digital assistants (PDA), or webcams for personal computers, the camera modules must have a lens system with high resolution but short overall length (the distance from the object-side surface of the imaging lens to the imaging plane of the camera module). Therefore, lenses of imaging lenses system are generally designed to provide at least one large curvature lens surface to correct aberration and increase resolution. However, large curvature lens surfaces increase the intervals between adjacent lenses and harmful stray light may enter the lens system, which has various undesirable effects on the performance of the lens system.

Therefore it is desirable to provide a lens system, which can overcome the above problems.

DETAILED DESCRIPTION

Figure 1:
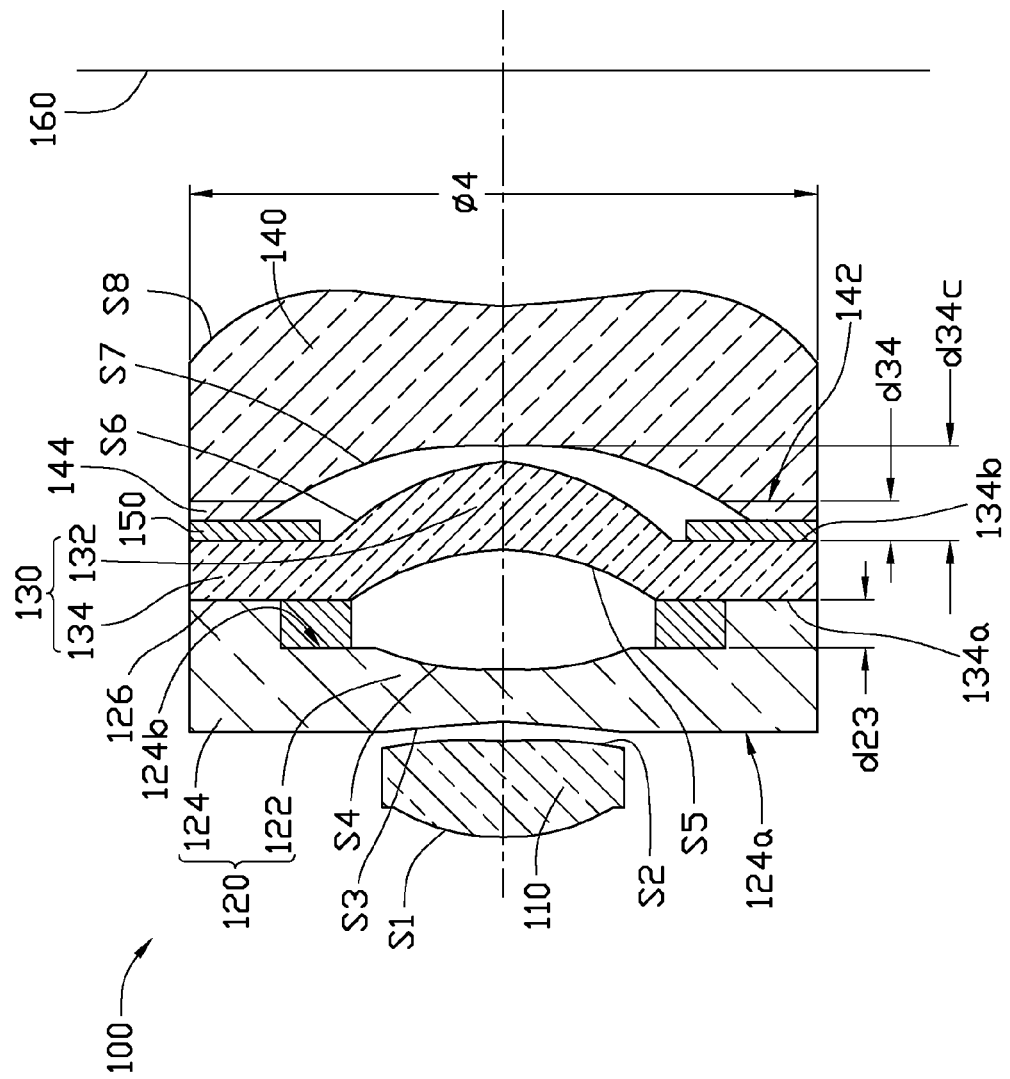
FIG. 1 is a schematic view of a lens system in accordance with an embodiment.

Referring to FIG. 1, a lens system 100 according to one exemplary embodiment, in order from the object side to the image side thereof, includes a first lens 110 with positive refractive power, a second lens 120 with negative refractive power, a third lens 130 with positive refractive power, and a fourth lens 140 with either positive or negative refractive power. Each of the first through fourth lenses 110~140 includes two lens surfaces at the image side and object side to converge or diverge transmitted light.

The first lens 110 is a biconvex lens and includes a first lens surface 51 and a second lens surface S2 in order from the object side to the image side.

The second lens 120 is a biconcave lens and includes a third lens surface S3 and a fourth lens surface S4 in order from the object side to the image side. The second lens 120 includes a first optical portion 122 and a first support portion 124 surrounding the first optical portion 122. The first support portion 124 includes a first surface 124a and an opposite second surface 124b facing the image side. A flange 126 protrudes from the second surface 124b towards the image side of the lens system 100, attached with the third lens 130.

The third lens 130 is a meniscus lens and includes a fifth lens surface S5 and a sixth lens surface S6 in order from the object side to the image side. The third lens 130 includes a second optical portion 132 and a second support portion 134 surrounding the second optical portion 132. The second support portion 134 includes a third surface 134a and an opposite fourth surface 134b facing the image side.

The fourth lens 140 is a biconcave lens and includes a seventh lens surface S7 and an eighth lens surface S8 in order from the object side to the image side. The fourth lens 140 further includes a light stop surface 142 facing the object side of the lens system 100 and surrounding the seventh lens surface S7, and an annular shim 144 is mounted on the stop surface 142. All of the lens surfaces S1 to S8 are aspheric.

In the present disclosure, the first to fourth lens 110~140 can be made of glass material to eliminate aberrations and enhance the performance of the lens system, or of transparent resin to reduce the cost of the lens system.

The lens system 100 further includes an aperture stop 150 and an image sensor 160. The aperture stop 150 is positioned between, and adhered to the third lens 130 and the fourth lens 140. The image sensor 160 is positioned at the imaging plane of the lens system 100 for receiving the optical image formed by the lens system 100 and photo-electrically converting the optical image into image signals.

In order to shorten the overall length of the lens system 100 and prevent stray light entering the lens system 100, the lens system 100 satisfies the following formula (a): $d_{23}<1.1\times d_{34}$; where $d_{23}$ is the distance along the optical axis of the lens system 100 from the second surface 124b of the second lens 120 to the third surface 134a of the third lens 130, and $d_{34}$ is the distance along the optical axis of the lens system 100 from the fourth surface 134b to the light stop surface 142 of the fourth lens 140.

The formulas (a) ensures the distance between the third lens 130 and the fourth lens 140 along the optical axis of the lens system 100 is big enough for accommodating the large curvature lens surface of the third lens 130, while reducing the distance between the second lens 120 and the third lens 130 to reduce the overall length of the lens system 100. In addition, the aperture stop 150 disposed between the fourth lens 140 and the third lens 130 can effectively prevent stray light from entering the fourth lens 140.

Alternatively, the lens system 100 may further satisfy the following formula (b): $d_{34}<0.1\times\phi 4$, where $\phi 4$ is the outer diameter of the fourth lens 110. Formula (b) ensures the lens system 100 to be compact.

Alternatively, the lens system 100 may yet further satisfy the following formula (c): $d_{34}<d_{34c}$, where $d_{34c}$ is the distance along the optical axis of the lens system 110 from the center point of the seventh lens surface S7 of the fourth lens 140 to the fourth surface 134b of the third lens 130.

The formula (c) ensures the distance between the third lens 130 and the fourth lens 140 along the optical axis of the lens system 100 is big enough for accommodating the large curvature lens surface of the third 130, thereby further reducing the overall length of the lens system 100.

Detailed examples of the lens system 100 are given below, but it should be noted that the lens system 100 is not limited to those examples. Listed below are the symbols used in detailed examples:

R: radius of curvature;

D: distance between two adjacent lens surfaces along the optical axis of the lens system 100; and C: conical coefficient of each lens surface;

Tables 1, 2 show the lens data of an exemplary embodiment, where the pupil radius of the lens system 100 is 2.0 mm, and the overall length of the lens system 100 is 2.4 cm.

TABLE 1

| Lens surface | R(mm) | D(mm) | C |
| --- | --- | --- | --- |
| S1 | 1.186431 | 0.5124478 | −0.4817564 |
| S2 | −5.73043 | 0.1 | −300 |
| S3 | −2.323946 | 0.32 | 0.7955866 |
| S4 | −36.35742 | 0.5910152 | 0 |
| S5 | −1.140924 | 0.4629918 | 0.0404088 |
| S6 | −0.8310764 | 0.1 | −2.806995 |
| S7 | −7.600847 | 0.7363099 | 0 |
| S8 | 1.681165 | 0.206 | −16.56742 |

Table 2 lists the aspheric coefficients of the lens surfaces of each lens 110~140.

TABLE 2

| Lens surface | K | A | B | C | D | E |
|---|---|---|---|---|---|---|
| S1 | −0.4817564 | 0.027809547 | 0.25751331 | −2.12575 | 6.7098661 | −7.6183648 |
| S2 | −300 | 0.01379851 | −0.052779569 | 1.3862868 | −7.7951195 | 7.4200103 |
| S3 | 0.7955866 | 0.49432381 | −0.56598918 | −0.024791235 | −0.94493108 | 0 |
| S4 | 0 | 0.41970372 | −0.15139158 | −0.37788836 | 0.78115421 | 0 |
| S5 | 0.0404088 | 0.25898809 | −1.1100482 | 3.0462237 | −3.4648943 | 1.7720142 |
| S6 | −2.806995 | −0.24913678 | −0.034063924 | 0.34831869 | −0.0076445571 | −0.046207963 |
| S7 | 0 | −0.31540436 | 0.19175193 | 0.069164591 | −0.15858844 | 0.059765584 |
| S8 | −16.56742 | −0.14300961 | 0.072084823 | −0.032492137 | 0.0082054096 | −0.0010787984 |

The aspherical surface is shaped according to the formula:

$$z = \frac{ch^2}{1+\sqrt{1-(k+1)c^2h^2}} + Ah^4 + Bh^6 + Ch^8 + Dh^{10} + Eh^{12},$$

wherein a light travelling direction along an optical axis is taken as z, a direction perpendicular to the optical is taken as h, c represents a paraxial radius of curvature, k represents a conical coefficient constant, and A to E denote i-th order correction coefficients of the aspheric surfaces.

Figure 2:
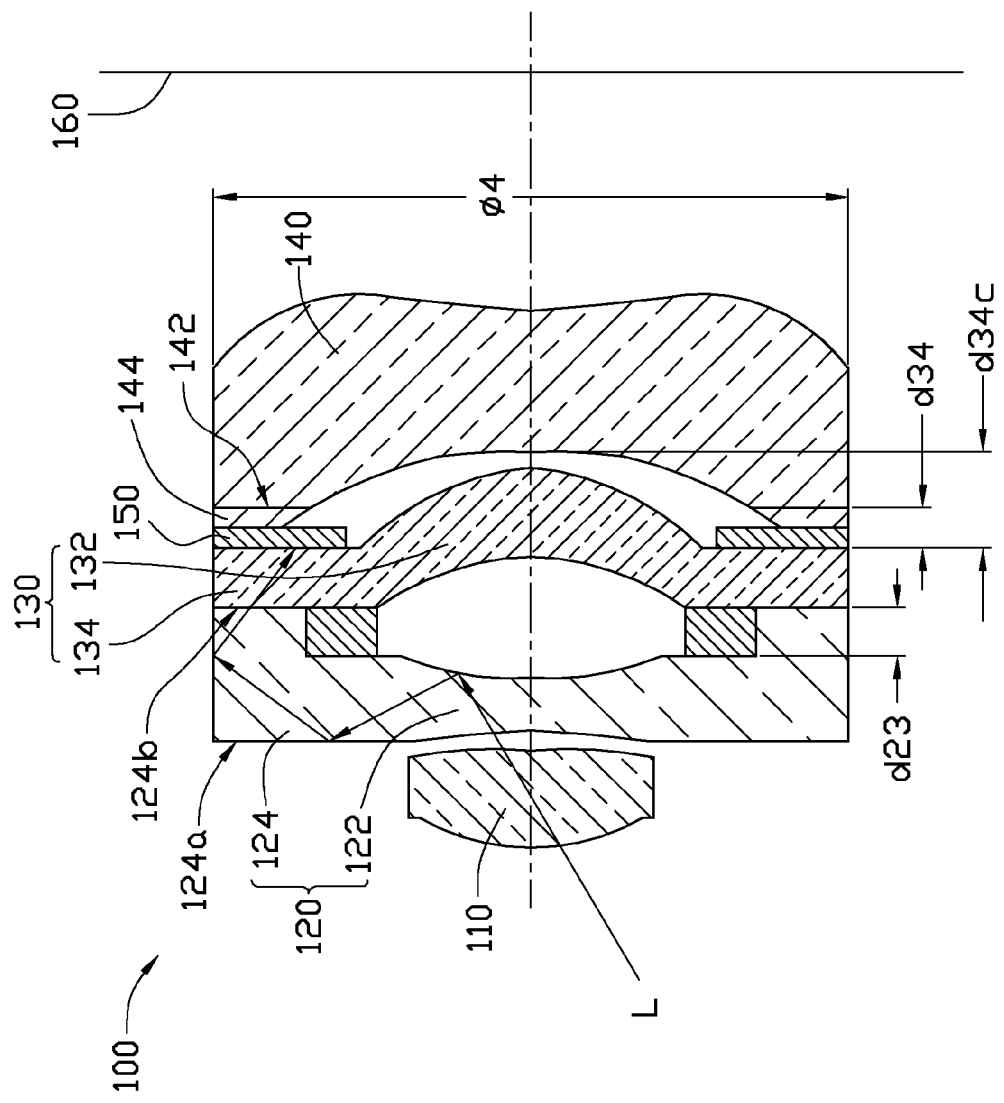
FIG. 2 is similar to FIG. 1, but showing a light path of a stray light beam transmitting in the lens system of FIG. 1.

In use, referring to FIG. 2, a stray light L is generated at the second lens surface S4 of the second lens 120, and projects to the first surface 124a of the second lens 120. Then, the stray light L is reflected by the first surface 124a of the second lens 120 and a side surface of the second lens 120, and projects towards the fourth lens 140 through the third lens 130. The stray light L is finally stopped by the light stop 150 situated in the way of the stray light L, thereby preventing the stray light L from entering the fourth lens 140 and effecting on image sensor 160.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens system, in order from the object side to the image side, comprising a first lens with positive refractive power, a second lens with negative refractive power, a third lens with positive refractive power, a fourth lens with positive refractive power, and an aperture stop positioned between the third lens and the fourth lens; wherein,
the second lens comprises a first optical portion, and a first support portion surrounding the first optical portion, the first support portion having a first surface and an opposite second surface facing the image side, and a flange protruding from the second surface and attached to the third lens;
the third lens comprises a second optical portion and a second support portion surrounding the second optical portion; and the second support portion comprises a third surface and an opposite fourth surface facing the image side;
the fourth lens comprises a surface facing the object side, and an annular shim mounted on the surface of the fourth lens; and
the lens system satisfies the following formula: $d_{23}<1.1 \times d_{34}$, where $d_{23}$ is the distance along the optical axis of the lens system from the second surface of the second lens to the third surface of the third lens, and $d_{34}$ is the distance along the optical axis of the lens system from the fourth surface to the surface of the fourth lens.

2. The lens system as claimed in claim 1, wherein the lens system further satisfies the following formula: $d_{34}<0.1 \times \phi 4$, where $\phi 4$ is the outer diameter of the fourth lens.

3. The lens system as claimed in claim 2, wherein the lens system further satisfies the following formula: $d_{34}<d_{34c}$, where $d_{34c}$ is the distance along the optical axis of the lens system from the center point of the object side lens surface of the fourth lens to the fourth surface of the third lens.

4. The lens system as claimed in claim 3, wherein the first through fourth lenses comprise a plurality of lens surfaces, and the lens surfaces of all the first through fourth lenses are aspheric surfaces.

5. The lens system as claimed in claim 4, wherein the first through fourth lenses are made of transparent resin.

6. The lens system as claimed in claim 4, wherein the first through fourth lenses are made of glass material.

7. A lens system, in order from the object side to the image side, comprising a first lens with positive refractive power, a second lens with negative refractive power, a third lens with positive refractive power, and a fourth lens with negative refractive power, and an aperture stop positioned between the third lens and the fourth lens; wherein,
the second lens comprises a first optical portion, and a first support portion surrounding the first optical portion, the first support portion having a first surface and an opposite second surface facing the image side, and a flange protruding from the second surface, the flange comprising a flange surface facing the image side, and the flange surface adhered to the third lens;
the third lens comprises a second optical portion and a second support portion surrounding the second optical portion; and the second support portion comprises a third surface adhered to the flange surface of the flange of the second lens, and a fourth surface facing the image side;
the fourth lens comprises a surface facing the object side of the lens system, and an annular shim mounted on the surface of the fourth lens and sandwiched between the aperture stop and the surface of the fourth lens; and
the lens system satisfies the following formula: $d_{23}<1.1 \times d_{34}$, where $d_{23}$ is the distance along the optical axis of the lens system from the second surface of the second lens to the third surface of the third lens, and $d_{34}$ is the distance along the optical axis of the lens system from the fourth surface to the surface of the fourth lens.

8. The lens system as claimed in claim 7, wherein the lens system further satisfies the following formula: $d_{34}<0.1 \times \phi 4$, where $\phi 4$ is the outer diameter of the fourth lens.

9. The lens system as claimed in claim 8, wherein the lens system further satisfies the following formula: $d_{34}<d_{34c}$, where $d_{34c}$ is the distance along the optical axis of the lens system from the center point of the object side lens surface of the fourth lens to the fourth surface of the third lens.

10. The lens system as claimed in claim 9, wherein the first through fourth lenses comprise a plurality of lens surfaces, and the lens surfaces of all the first through fourth lenses are aspheric surfaces.

11. The lens system as claimed in claim 10, wherein the first through fourth lenses are made of transparent resin.

12. The lens system as claimed in claim 10, wherein the first through fourth lenses are made of glass material.

* * * * *